United States Patent
Xie et al.

(10) Patent No.: US 9,405,903 B1
(45) Date of Patent: Aug. 2, 2016

(54) SINKHOLING BAD NETWORK DOMAINS BY REGISTERING THE BAD NETWORK DOMAINS ON THE INTERNET

(71) Applicant: Palo Alto Networks, Inc., Santa Clara, CA (US)

(72) Inventors: Huagang Xie, Pleasanton, CA (US); Wei Xu, Santa Clara, CA (US); Nir Zuk, Menlo Park, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 196 days.

(21) Appl. No.: 14/068,272

(22) Filed: Oct. 31, 2013

(51) Int. Cl.
*H04L 29/06* (2006.01)
*G06F 21/56* (2013.01)

(52) U.S. Cl.
CPC ..................................... *G06F 21/56* (2013.01)

(58) Field of Classification Search
CPC ....................................................... G06F 21/56
See application file for complete search history.

(56) References Cited

U.S. PATENT DOCUMENTS

| | | | |
|---|---|---|---|
| 8,561,177 B1* | 10/2013 | Aziz | G06F 21/554 726/22 |
| 8,566,928 B2 | 10/2013 | Dagon et al. | |
| 2004/0073640 A1 | 4/2004 | Martin et al. | |
| 2008/0028463 A1* | 1/2008 | Dagon et al. | 726/22 |
| 2009/0089426 A1 | 4/2009 | Yamasaki et al. | |
| 2011/0283359 A1 | 11/2011 | Prince et al. | |
| 2011/0283361 A1* | 11/2011 | Perdisci et al. | 726/24 |
| 2012/0303808 A1 | 11/2012 | Xie | |
| 2013/0080574 A1* | 3/2013 | Prince | H04L 61/6013 709/217 |
| 2013/0174253 A1* | 7/2013 | Thomas et al. | 726/22 |
| 2013/0232574 A1* | 9/2013 | Carothers | 726/22 |
| 2014/0143825 A1 | 5/2014 | Behrendt et al. | |
| 2014/0245436 A1* | 8/2014 | Dagon et al. | 726/22 |
| 2014/0283063 A1* | 9/2014 | Thompson et al. | 726/23 |
| 2015/0007250 A1* | 1/2015 | Dicato, Jr. | G06F 21/50 726/1 |
| 2015/0143504 A1* | 5/2015 | Desai | H04L 45/14 726/13 |

FOREIGN PATENT DOCUMENTS

WO 2007050244 5/2007

OTHER PUBLICATIONS

Guy Bruneau, DNS Sinkhole, Aug. 7, 2010, Sans Institute, pp. 1-41.*
Pedro Marques da Luz, Thesis, Botnet Detection Using Passive DNS, 2013/2014.
Seung Won Shin, Protecting Networked Systems from Malware Threats, Aug. 2013.
Christian Rossow, Thesis, Using Malware Analysis to Evaluate Botnet Resilience, Apr. 23, 2013.

* cited by examiner

*Primary Examiner* — Jeffrey Pwu
*Assistant Examiner* — William Corum, Jr.
(74) *Attorney, Agent, or Firm* — Van Pelt, Yi & James LLP

(57) ABSTRACT

Techniques for sinkholing bad network domains by registering the bad network domains on the Internet are provided. In some embodiments, sinkholing bad network domains by registering the bad network domains on the Internet includes determining a network domain is a bad network domain, in which the bad network domain is determined to be associated with an identified malware (e.g., malware that has been identified and has been determined to be associated with the bad domain), and the bad network domain is sinkholed by registering the bad network domain with a sinkholed IP address; and identifying a host that is infected with the identified malware based on an attempt by the host to connect to the sinkholed IP address.

21 Claims, 7 Drawing Sheets

SINKHOLING BAD NETWORK DOMAINS BY REGISTERING THE BAD NETWORK DOMAINS ON THE INTERNET

BACKGROUND OF THE INVENTION

Malicious software (malware) generally refers to unwanted, hostile, or intrusive software that can be used to disrupt computer or network operation, collect private or sensitive information, or access private computer systems or networks. Malware can be in the form of executable code, scripts, active content, and other software. Example malware includes computer viruses, worms, trojan horses, rootkits, keyloggers, spyware, adware, botnet command and control (C&C) related malware, and other unwanted, hostile, or intrusive software.

Security solutions (e.g., security devices or appliances, which can provide firewall solutions) can be used to safeguard against malware. For example, a firewall can identify and prevent the further spread of malware in a network.

A firewall generally protects networks from unauthorized access while permitting authorized communications to pass through the firewall. A firewall is typically implemented as a device or a set of devices, or software executed on a device, such as a computer or appliance, that provides a firewall function for network access. For example, firewalls can be integrated into operating systems of devices (e.g., computers, smart phones, tablets, or other types of network communication capable devices). Firewalls can also be integrated into or executed as software on servers, gateways, network/routing devices (e.g., network routers), or appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
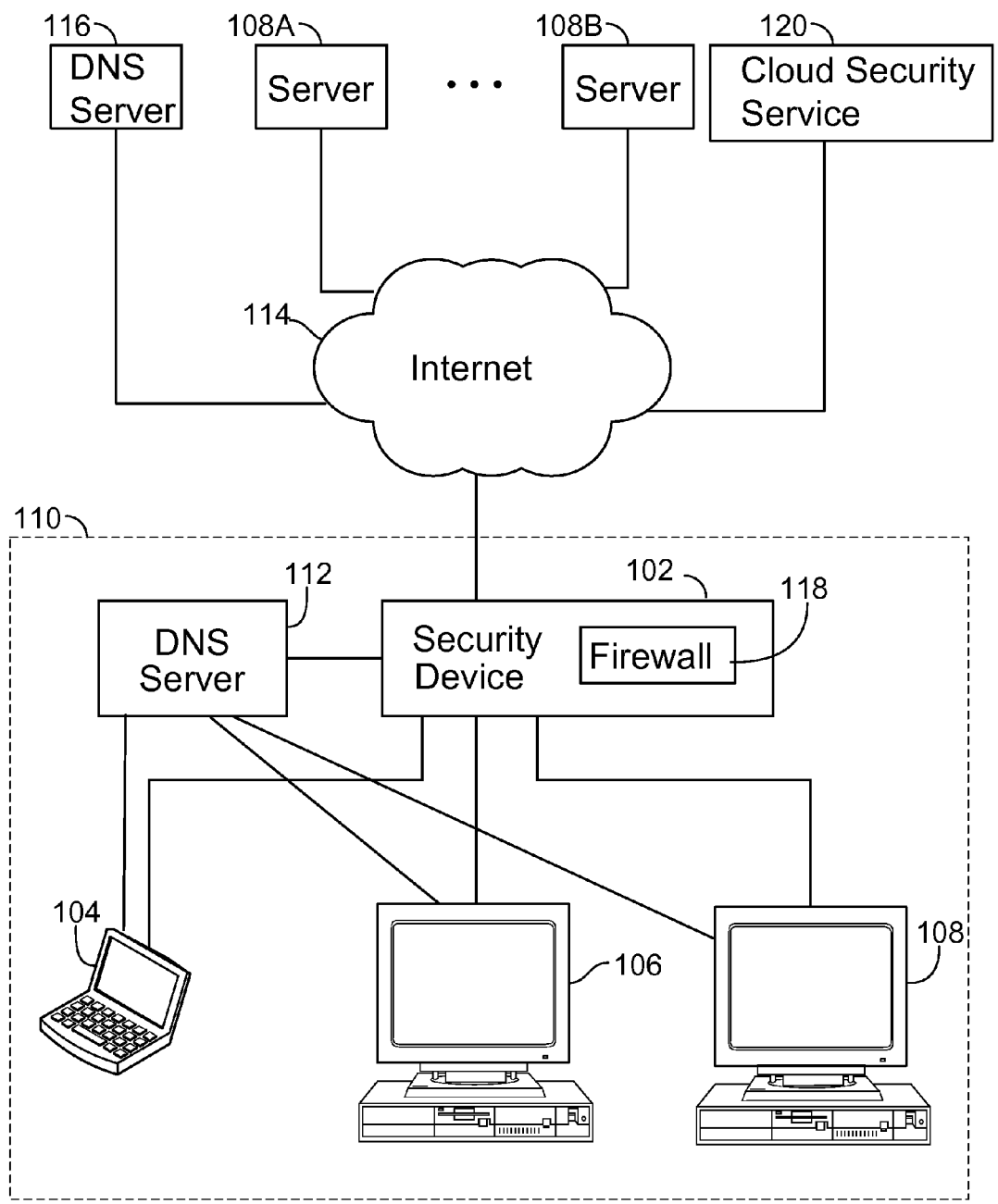
FIG. 1 is a functional block diagram illustrating an architecture for sinkholing bad network domains by registering the bad network domains on the Internet in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Malicious software (malware) generally refers to unwanted, hostile, or intrusive software that can be used to disrupt computer or network operation, collect private or sensitive information, or access private computer systems or networks. Malware can be in the form of executable code, scripts, active content, and other software. Example malware includes computer viruses, worms, trojan horses, rootkits, keyloggers, spyware, adware, botnet command and control (C&C) related malware, and other unwanted, hostile, or intrusive software.

Security solutions (e.g., security devices or appliances, which can provide firewall solutions) can be used to safeguard against malware. For example, a firewall can identify and prevent the further spread of malware in a network.

A firewall generally protects networks from unauthorized access while permitting authorized communications to pass through the firewall. A firewall is typically implemented as a device or a set of devices, or software executed on a device, such as a computer or appliance, that provides a firewall function for network access. For example, firewalls can be integrated into operating systems of devices (e.g., computers, smart phones, tablets, or other types of network communication capable devices). Firewalls can also be integrated into or executed as software on servers, gateways, network/routing devices (e.g., network routers), or appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

A network domain generally refers to a domain that is identified by a domain name. A domain name typically includes an identification string (e.g., www.example-website.com) that defines a realm of authority or control for a domain on the Internet. Domain names are generally formed by rules and procedures of the Domain Name System (DNS). A domain name can be registered in the DNS as a domain name.

Network domains can be used in various networking contexts and application-specific naming and addressing purposes. For example, a domain name can be used to identify an Internet Protocol (IP) resource, such as a web site (e.g., a server hosting a web site), or any other service accessible via the Internet (e.g., a File Transfer Protocol (FTP) resource or other services accessible via the Internet).

A DNS service can be used to translate a domain name into an IP address. For example, when a user types in a domain name (e.g., an Internet or Intranet domain name), such as example.com, using a web browser, an authoritative DNS server can translate the domain name into an IP address, such as 172.16.254.1 (for IPv4) and 2001:db8:0:1234:0:567:8:1 (for IPv6). However, if a user attempts to perform a DNS lookup or host command on an unregistered or invalid domain name, such as examplefakedomain.com, then an error can be received indicating that such is a non-existing domain name, or in other words, that such is a non-existent domain (NXDOMAIN). Generally, an NXDOMAIN is a condition or error that can be indicated for an Internet domain name that is unable to be resolved using the DNS servers (e.g., invalid domain name) or that the Internet domain name is not yet registered. In some cases, an NXDOMAIN can also be indicated due to a network or DNS server problem.

Network domains can also be used by malware. For example, malware can be distributed or propagated using a network domain, such as www.bad-malware-download-site.com. As another example, botnet C&C related malware can be associated with a network domain, such as www.botnet-site.com. Various commercial efforts as well as open project efforts exist to provide listings of network domains that are known to be used to distribute or propagate malware. Some approaches use such network domain listings to provide spoofed replies, in response to any requests to a network domain on such a listing, as a mechanism for preventing propagation of malware distribution.

Blackholing is a technique that can be used to send all traffic (e.g., network communications) to a network domain (e.g., DNS or IP address) to a null interface or non-existent server (e.g., sometimes referred to as a black hole). For example, an Internet Service Provider (ISP) can manage such blackholing for efficiency and to avoid affecting network connectivity. However, while blackholing may be efficient for certain types of severe network attacks, such an approach fails to allow for analysis of the traffic to the blackholed network domain.

Thus, existing approaches fail to identify hosts that are infected with malware. Also, existing approaches fail to determine that a given host that attempts to connect to a network domain is infected with an identified malware (e.g., a previously identified, known version of malware).

What are needed are new and improved techniques for identifying and monitoring network domains that are associated with malware (e.g., bad network domains).

Sinkholing generally refers to a technique for routing traffic (e.g., network communications) to a valid IP address. For example, a network device (e.g., server or appliance) associated with the valid IP address can receive the traffic that was directed to the sinkholed IP address that is associated with the network domain. The network device that receives the traffic can analyze the traffic. Based on the analysis of the traffic, the network device can then perform an action (e.g., reject bad packets or perform some other action).

Accordingly, techniques for sinkholing bad network domains by registering the bad network domains on the Internet are provided. In some embodiments, sinkholing bad network domains by registering the bad network domains on the Internet includes determining a network domain is a bad network domain, in which the bad network domain is determined to be associated with an identified malware (e.g., malware that has been identified and has been determined to be associated with the bad domain), and the bad network domain is sinkholed by registering the bad network domain with a sinkholed IP address (e.g., a valid IP address that is owned by, for example, a security service provider, which can provide a network device that is configured with the valid IP address and is also configured for monitoring connection attempts to the bad network domain); and identifying a host that is infected with the identified malware based on an attempt by the host to connect to the sinkholed IP address.

For example, a cloud security service provider can register the bad network domain with a valid IP address that is associated with, for example, a server or appliance controlled by the cloud security service provider. The server or appliance can be configured with various open multiple ports, such as port 80, port 8080, port 344, and/or other ports, and can also be configured to listen for connection requests. The cloud security service provider can thereby monitor and log attempts by clients to connect to the sinkholed bad network domain. Accordingly, this approach allows the cloud security service provider to identify clients that are infected with identified malware based on the logged attempts by such clients (e.g., logging session records, which can be stored for analysis and reporting) to connect to the sinkholed bad network domain.

As another example, malware can be automatically analyzed using DNS network traffic emulation techniques to determine that the malware is associated (e.g., uniquely associated) with a bad network domain, such as an NXDOMAIN. The bad network domain can be registered to a valid IP address that a security entity (e.g., a security provider) controls, such that the bad network domain is sinkholed to an IP address (e.g., the sinkholed IP address) that the security entity controls. As a result, traffic from hosts (e.g., host devices, such as a computer, laptop, tablet, smart phone, server and/or another type of computing device) that is resolved to this IP address can be analyzed by a network device controlled by the security entity, which can then, for example, determine which clients attempted to connect to that bad network domain (e.g., log which clients attempted to connect to the bad network domain and how many times) and/or perform various other actions. As an example, by analyzing such logged traffic, the security provider can determine which hosts and networks (e.g., hosts, ISPs, and/or company networks, even if such are not customers of the cloud security service) are infected with the known malware (e.g., identified malware) based on logged attempts to connect to the bad network domain. Entities that are associated with such hosts and networks (e.g., even if such are not customers of the cloud security service, but which can be contacted as a prospective customer by the security provider, which can inform such prospective customer of which host(s) may be infected with the identified malware) can be informed of the infection with the identified malware by the security provider based on the analyzed log traffic. In one implementation, the cloud security service provides a network device that is configured with the sinkholed IP address, and the network device is further configured to not provide any response to requests from the infected hosts except for completing an initial connection setup (e.g., TCP handshake).

In one embodiment, sinkholing bad network domains by registering the bad network domains on the Internet further includes determining that the bad network domain is not a registered network domain. In one embodiment, sinkholing bad network domains by registering the bad network domains on the Internet further includes registering the bad network domain with a domain registry to the sinkholed IP address in order to sinkhole the bad network domain.

In one embodiment, sinkholing bad network domains by registering the bad network domains on the Internet further includes determining that the bad network domain is a non-existent domain (NXDOMAIN), in which the bad network domain can be registered with a domain registry to the sinkholed IP address in order to sinkhole the bad network domain.

In one embodiment, sinkholing bad network domains by registering the bad network domains on the Internet further includes generating a log for each attempted host connection to the sinkholed IP address. For example, the log can be used to determine which hosts are infected with the identified malware based on the indication that such hosts attempted to connect to the sinkholed IP address.

In one embodiment, sinkholing bad network domains by registering the bad network domains on the Internet further includes: determining that the bad network domain is not a registered network domain; registering the bad network domain with a domain registry to the sinkholed IP address in order to sinkhole the bad network domain; and generating a log for an attempted connection from a host to the sinkholed IP address.

In one embodiment, sinkholing bad network domains by registering the bad network domains on the Internet further includes: determining that the bad network domain is a registered network domain; and changing the registered network domain for the bad network domain with a domain registry to a new IP address in order to sinkhole the bad network domain using the new IP address, in which the new IP address corresponds to the sinkholed IP address.

In one embodiment, sinkholing bad network domains by registering the bad network domains on the Internet further includes generating one or more signatures for a plurality of bad network domains. In one embodiment, sinkholing bad network domains by registering the bad network domains on the Internet further includes distributing the one or more signatures to a plurality of security devices to determine a set of candidate bad network domains for sinkholing.

In one embodiment, sinkholing bad network domains by registering the bad network domains on the Internet further includes: receiving a plurality of malware samples; and executing each of the plurality of malware samples to identify a plurality of bad network domains. For example, a cloud security service can receive a malware sample from a security device (e.g., a security appliance or other security device that includes a firewall). The malware sample can be automatically analyzed using various techniques, including executing the malware sample in a virtual execution environment to monitor network activities in order to identify network domains that the malware sample attempts to connect to during execution. If the malware sample is determined to be malware (e.g., identified malware), then these network domains can then be determined to be bad network domains associated (e.g., uniquely associated) with the identified malware. In some cases, a signature can be generated for each of these bad network domains. The security cloud service can distribute the signature to a plurality of security devices (e.g., security devices that are used by customers of the cloud security service). The signatures can then be used by the cloud security service to identify candidate bad network domains for sinkholing based on a number of attempts by hosts that trigger each such signature (e.g., based on a number of hosts that attempt to connect to a particular bad network domain). This approach can be used to identify candidate bad network domains for sinkholing using various techniques further described herein, which also allows for a more efficient and focused sinkholing of bad network domains (e.g., as malware can generate many different network domains, such as by using domain generation algorithms (DGAs), many of which are generated for evasion detection purposes and take-down evasion purposes, and are not actually or frequently used to attempt to connect to by many or any of the malware samples executing in the wild).

In one embodiment, sinkholing bad network domains by registering the bad network domains on the Internet further includes determining that a plurality of connections were attempted to the bad network domain (e.g., an NXDOMAIN). For example, determining that a threshold number of connections were attempted to the bad network domain can be implemented using traffic analysis techniques (e.g., implemented using a firewall), such as by logging signature matches (e.g., a DNS signature that is implemented using a firewall, in which the DNS signature was generated for identifying attempted connections to the bad network domain) indicating that one or more hosts attempted to connect to the bad network domain. This approach can be used to indicate that the bad network domain (e.g., NXDOMAIN) is a good candidate for sinkholing. In some implementations, if a threshold number of connections were attempted to the bad network domain (e.g., requiring a threshold number of connections can be used to disregard noise that can result from mistyped network domain queries and DGA randomly generated network domains that were not commonly queried by the malware), then the bad network domain can be determined to be a candidate for sinkholing, using various techniques described herein. This approach can be used to verify which of the initially identified set of bad network domains (e.g., NXDOMAINs) are candidates for sinkholing by registering with a valid IP address (e.g., an IP address owned by the cloud security service provider) to effectively sinkhole such bad network domains.

In one embodiment, sinkholing bad network domains by registering the bad network domains on the Internet further includes not responding to a connection request from a host to the sinkholed IP address.

In one embodiment, sinkholing bad network domains by registering the bad network domains on the Internet further includes receiving a malware sample (e.g., a file that can include an executable file, a Microsoft Office® file, an Adobe PDF® file, Java file, or another format of file, which can be received from a customer) at a cloud security service; automatically analyzing the malware sample (e.g., monitoring behavior using various emulation techniques to determine if the malware sample can be identified as malware (identified malware), and monitoring network traffic to log network traffic, including, for example, DNS traffic); and if the malware sample is determined to be malware, analyzing network domains from logged DNS network traffic (e.g., using DNS signatures generated for bad network domains identified as associated with the identified malware based on analysis of the malware during emulation) at a security device (e.g., a security appliance or server that includes a firewall) to automatically determine one or more candidate bad network domains for sinkholing (e.g., based on a logged number of triggered DNS signatures that exceed a threshold number, for example, during a predefined period of time).

FIG. 1 is a functional block diagram illustrating an architecture for sinkholing bad network domains by registering the bad network domains on the Internet in accordance with some embodiments. As shown, a security device 102 is at the perimeter of a protected network 110, which includes client devices (e.g., clients) 104, 106, and 108. For example, security device 102 can include a firewall function, such as firewall 118 as shown, to protect the network and clients within network 110, which is in communication with the Internet 114 and various servers, such as DNS server 116, and other Internet resources/servers shown as 108A and 108B (e.g., web servers, mail servers, file servers such as an FTP server, and/or other types of resources/servers). For example, security device 102 can be implemented as a data appliance or a server that can perform various security functions, including firewall 118. Security device 102 is also in communication with a cloud security service 120 via Internet 114 as shown. In some implementations, security device 102 is implemented using a data appliance (e.g., a security appliance), a gateway (e.g., a security server), a server (e.g., a server that executes security software including firewall 118), and/or some other security device, which, for example, can be implemented using computing hardware, software, or various combinations thereof.

In some implementations, one or more of clients 104, 106, and 108 can include a firewall (e.g., host-based firewall). For example, clients 104, 106, and 108 can include various computing devices that can access the Internet via wired and/or wireless communications, such as computers, laptops, tablets, smart phones, and/or various other types of computing devices with network communication capabilities. As is also shown, Internet resources/servers shown as 108A and 108B are in communication with the Internet 114. For example, a client device can access a service provided by a server via the Internet, such as a web related service (e.g., web sites, cloud-based services, streaming services, or email services), peer-to-peer related service (e.g., file sharing), IRC service (e.g., chat service), and/or any other service that can be delivered via the Internet.

As is also shown in FIG. 1, clients 104, 106, and 108 are also in communication with a local DNS server 112 of network 110. For example, DNS server 112 can perform a DNS service to translate a domain name into an IP address. For example, when a user types in a domain name (e.g., an Internet or Intranet domain name), such as example.com, using a web browser on a client (e.g., client 104, 106, or 108), an authoritative DNS server can translate the domain name into an IP address, such as 172.16.254.1 (for IPv4) and 2001:db8:0:1234:0:567:8:1 (for IPv6). If DNS server 112 does not have a locally cached result for the requested domain name, then DNS server 112 can communicate to another DNS server, such as DNS server 116 via Internet 114 to obtain the translation for the domain name into an IP address (e.g., note that the communication between DNS server 112 and DNS server 116 passes through security device 102 as shown). In contrast, DNS requests from clients 104, 106, and 108 to local DNS server 112 are not required to pass through security device 102 as shown for the network architecture for network 110. As similarly discussed above, if a user or client attempts to perform a DNS lookup or host command on an unregistered or invalid domain name, such as examplefakedomain.com, then an error can be received indicating that such is a non-existing domain name, or in other words, that such is a non-existent domain (NXDOMAIN).

In particular, security device 102 can be used for implementing various techniques for sinkholing bad network domains by registering the bad network domains on the Internet as described herein with respect to various embodiments. For example, security device 102 can periodically send malware samples to cloud security service 120, which can use such malware samples to identify malware and associated bad network domain(s) (if any). As another example, security device 102 can implement signatures (e.g., network signatures, such as DNS signatures) for detecting client requests for bad network domains, which can then be logged and periodically communicated to cloud security service 120. As yet another example, security device 102 can receive signatures (e.g., network signatures, such as DNS signatures) for detecting client requests for bad network domains from cloud security service 120 and implement the signatures to log events based on such signatures being triggered based on monitored network traffic passing through security device 102 and which can periodically communicate to cloud security service 120 such that cloud security service 120 can use such information to identify a set of candidate bad network domains for sinkholing.

In one embodiment, sinkholing bad network domains by registering the bad network domains on the Internet is implemented using security device 102 and cloud security service 120. For example, security device 102 (e.g., an integrated security appliance/gateway/server) can communicate with cloud security service 120 (e.g., using secure communications, such as encrypted communication techniques) to receive security related content updates (e.g., DNS related signatures, bad network domain related signatures, and/or policy/rules) and/or to provide malware samples, logged information (e.g., logged attempts to communicate to bad network domains observed based on triggered bad network domain signatures and/or DNS signatures), and/or other information. As another example, cloud security service 120 (e.g., using secure communications, such as encrypted communication techniques) can report (e.g., to a network or security administrator associated with network 110) that a host (e.g., client device 104, 106, or 108) is infected with identified malware based on a logged attempt(s) by that host(s) to communicate with a sinkholed IP address that is associated with a bad network domain. As will now be apparent, some or all of the functions described above with respect to FIG. 1 can be assisted by or implemented in whole or in part by cloud security service 120. In some implementations, cloud security service 120 can, for example, reduce the processing on security device 102.

Figure 2:
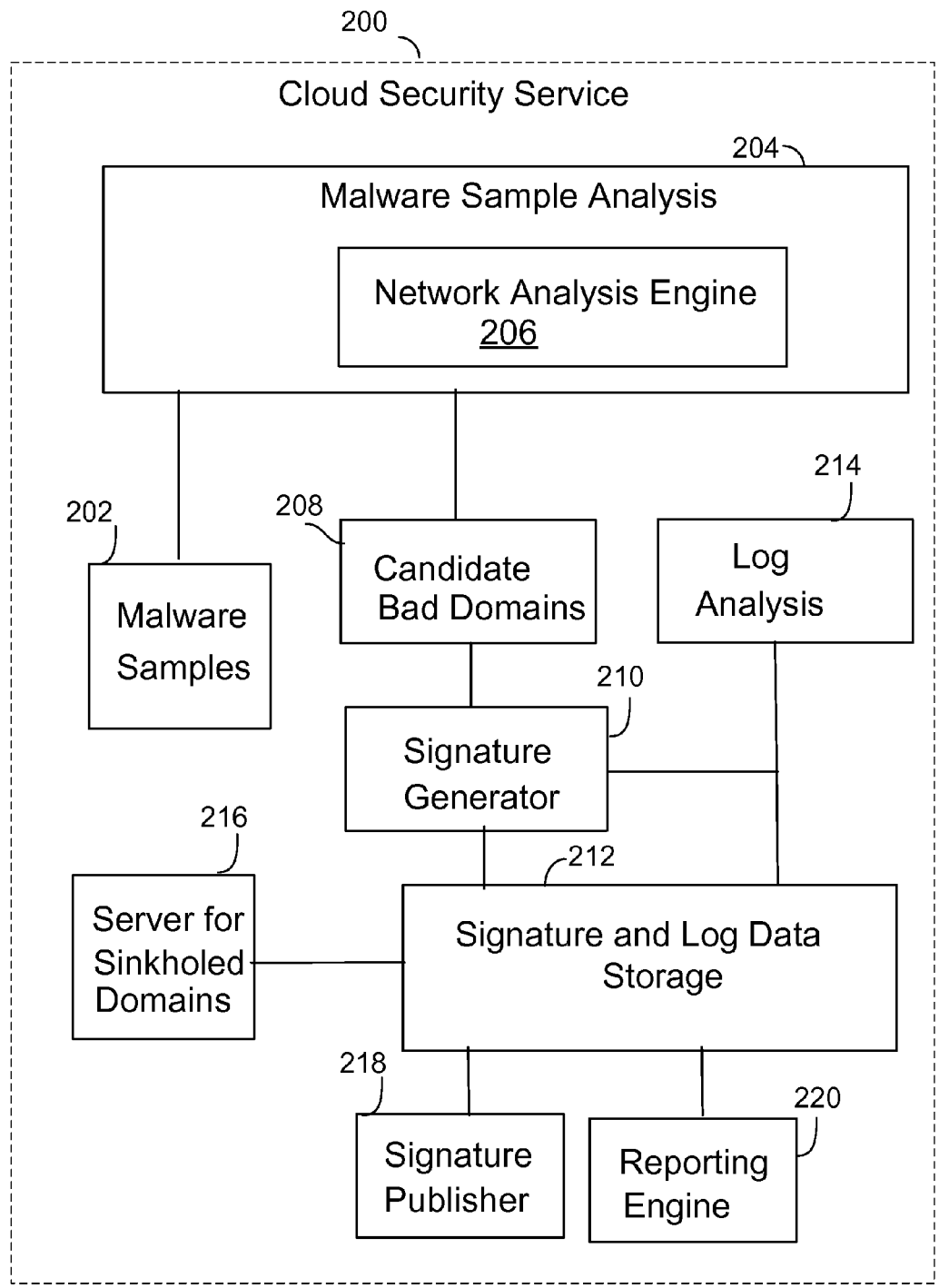
FIG. 2 is a functional block diagram illustrating a cloud security service for sinkholing bad network domains by registering the bad network domains on the Internet in accordance with some embodiments.

FIG. 2 is a functional block diagram illustrating a cloud security service for sinkholing bad network domains by registering the bad network domains on the Internet in accordance with some embodiments. In particular, cloud security service 200 is in communication with the Internet. For example, cloud security service 120 of FIG. 1 can be implemented as cloud security service 200 as shown in FIG. 2.

Referring to FIG. 2, cloud security service 200 includes malware samples 202 (e.g., executable files, Microsoft Office® files, Adobe PDF® files, Java files, and/or other types of files), which can be received from various customers (e.g., firewall 118 as shown in FIG. 1 and/or other firewalls or security devices from one or more customers of the cloud security service). Malware samples 202 are provided to malware sample analysis 204. Malware sample analysis 204 includes a network analysis engine 206. For example, when executing a malware sample using the malware sample analysis 204, which can be implemented as a virtualized environment for dynamic analysis of malware, whether the malware sample is determined to be malware can be performed using various malware detection techniques (e.g., based on identification of malicious behaviors, such as malicious network activity, exploits, software vulnerabilities, and/or other malicious behaviors including using heuristic-based behavioral analysis techniques). Also, malware sample analysis 204, using network analysis engine 206, can identify malware domains (if any) that the malware sample attempts to access, which can be logged and sent to candidate bad network domains 208 (e.g., by logging all DNS/domain query traffic during emulation of the identified malware, which generates a source of candidate bad network domains list associated with the identified malware). For example, whether each of the candidate bad network domains has been registered (e.g., by the malware developer) can be determined (e.g., if a DNS lookup receives an NXDOMAIN response, then it can be determined that the candidate bad network domain has not been registered). In some implementations, the cloud security service can register any such unregistered bad network domains to sinkhole such bad network domains (e.g., using sinkholed IP addresses, that is, valid IP addresses that are associated with, for example, one or more servers controlled by cloud security service 200, such as server 216 as shown). This approach also can uniquely associate an identified malware sample with one or more bad network domains, such that a host attempt to connect to such bad network domains (e.g., NXDOMAINS) can be used to determine that such hosts are infected with the identified malware sample. For example, such signatures are triggered by a client device (e.g., client device 104, 106, or 108 as shown in FIG. 1) attempting to connect to such an NXDOMAIN that triggers a signature implemented by the local firewall (e.g., firewall 118 as shown in FIG. 1), which can then also be used to determine that the client device is infected with identified malware, such that a responsive action can be performed (e.g., the client device can be disinfected, quarantined, reported to a network/security administrator for the network, the client device's attempt(s) to connect to the bad network domains(s) can be blocked, and/or some other responsive action).

In other cases, further analysis can be performed to determine which of the candidate bad network domains should be registered for sinkholing, as further described below. In some implementations, cloud security service 200 uses a signature generator 210 to generate signatures for candidate bad domains 208. These signatures are stored in signature and log data storage 212 (e.g., in some implementations, log data and signature data can be stored in separate data stores, such as different databases or other types of data stores) and can be distributed to security devices (e.g., security devices that include firewalls, such as security device 102 of FIG. 1) of customers of cloud security service 200 using signature publisher 218. For example, if during emulation analysis of malware-Sample-X (e.g., including logging DNS traffic during an instrumented virtualized emulation of malware-Sample-X), that malware sample attempts to connect to malware-bad-site-1.com, malware-bad-site-2.com, and malware-bad-site-3.com, then signatures (e.g., DNS signatures) can be generated for each of those candidate bad network domains. These signatures can be sent to firewalls of multiple customers of cloud security service 200, which can then log and report back to cloud security service 200 any attempts that such customer firewalls identify hosts attempting to connect to any of such candidate bad network domains, which can also be stored in signature and log data storage 212. Log analysis engine 214 can periodically analyze such received log data to determine which candidate bad network domains are bad network domains that malware-Sample-X (e.g., executing in the wild) actually attempts or more commonly attempts to connect to in order to focus on such candidate bad network domains for sinkholing. Based on this further analysis to focus on the most relevant candidate bad network domains, the cloud security service can then register such unregistered bad network domains, or (if already registered by the malware developer) attempt to change the registration, to sinkhole such bad network domains (e.g., using sinkholed IP addresses that are associated with one or more servers controlled by cloud security service 200, such as server 216 as shown). Thus, such further analysis can be used to determine which of the candidate bad network domains should be registered for sinkholing, which can be a more efficient approach as malware sometimes uses DGA techniques and other malware detection evasion techniques as discussed above. Accordingly, this approach allows cloud security service 200 to selectively register or change DNS registrations on bad network domains that were observed to have exceeded, for example, a threshold number of attempted hits (e.g., queries for attempted connections, such as during a predefined period of time) by hosts (e.g., infected with the identified malware performing in the wild).

As is also shown in FIG. 2, cloud security service provides a server 216 (e.g., or multiple servers or appliances) that can be associated with one or more sinkholed IP addresses for bad network domains using the above described techniques. Any attempts by hosts (e.g., clients 104, 106, or 108 as shown in FIG. 1, or other hosts, even if such are hosts that are not associated with customers of the cloud security service) can be determined using server for sinkholed domains 216 and logged to signature and log data storage 212 (e.g., or in some implementations, stored in a separate data store). Cloud security service 200 can uniquely associate an identified malware sample with one or more bad network domains, such that host attempts to connect to such bad network domains can be used to determine that such hosts are infected with the identified malware. Reporting engine 220 is configured to automatically report to customers (e.g., or others who may not be current customers) which host(s) are infected with identified malware based on logged attempts to connect to sinkholed IP addresses that are associated with bad network domains. Accordingly, this approach allows the cloud security service provider to use sinkholed domains to report which clients are infected with identified malware even for hosts that are not associated with a customer, as the cloud security service provider controls the IP addresses for the sinkholed domain such that traffic is directed to a network resource (e.g., server 216 as shown in FIG. 2) for monitoring, logging, and reporting which hosts attempt connections (e.g., client devices infected with malware-Sample-X that is sending C&C traffic to malware-bad-site-3.com) to such sinkholed bad domains.

Figure 3:
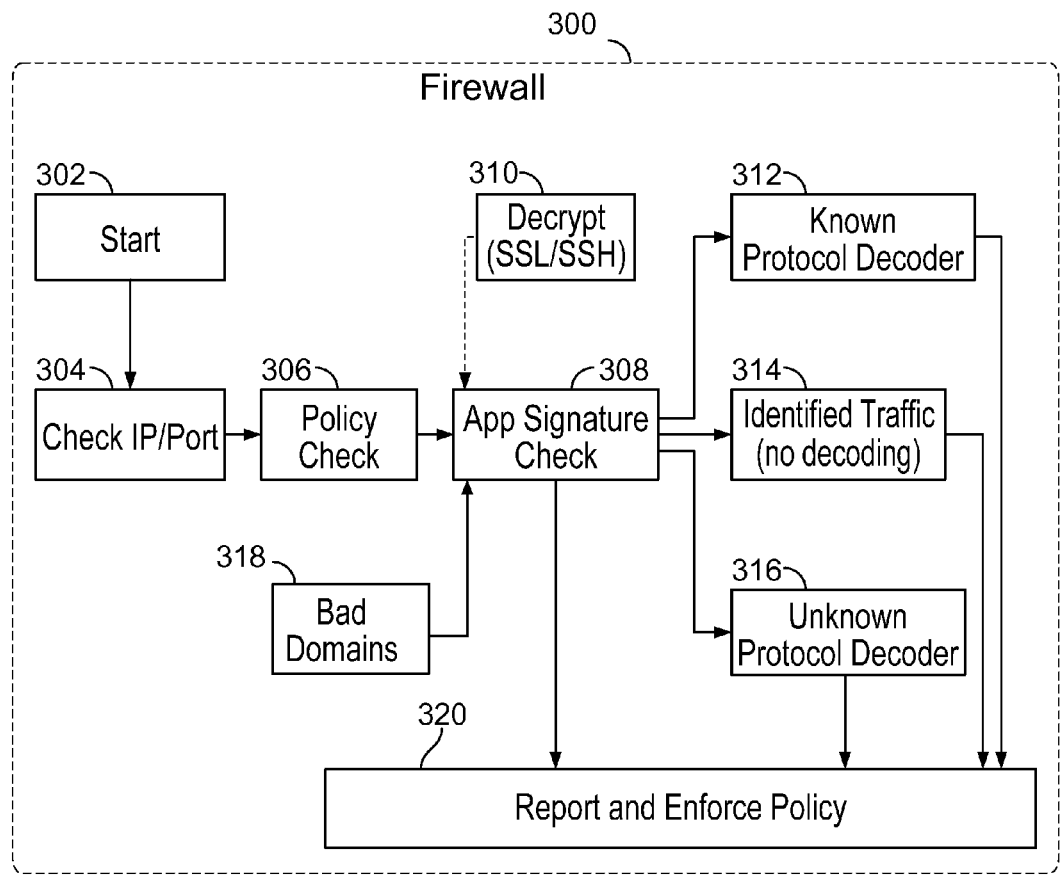
FIG. 3 is a functional block diagram illustrating a firewall for sinkholing bad network domains by registering the bad network domains on the Internet in accordance with some embodiments.

FIG. 3 is a functional block diagram illustrating a firewall for sinkholing bad network domains by registering the bad network domains on the Internet in accordance with some embodiments. In particular, security device 300 is in communication with the Internet. For example, firewall 118 of FIG. 1 can be implemented as firewall 300 as shown in FIG. 3.

In one embodiment, network traffic is monitored using a server (e.g., a computer server that includes security functions, such as a firewall executed on a processor(s) of the computer server). In one embodiment, network traffic is monitored using an appliance (e.g., a data appliance that includes security functions, such as a security appliance that includes a firewall executed on a processor(s) of the appliance). In one embodiment, network traffic is monitored using a gateway (e.g., a gateway that includes security functions, such as a security gateway). In one embodiment, network traffic is monitored using a host (e.g., security software executed on a host device, such as a network server or client computing device, such as a personal computer, laptop, tablet, or smart phone). In one embodiment, the network traffic is monitored using pass through (e.g., in-line) monitoring techniques. In one embodiment, the network traffic is collected and/or monitored for events and/or reporting based on events (e.g., some of the network traffic can be monitored using pass through techniques and/or some of the network traffic can be collected and analyzed for monitoring the network traffic offline, such as in logs of network traffic) as further described herein with respect to various embodiments.

In one embodiment, network traffic is monitored using a state-based firewall. In particular, the state-based firewall can monitor traffic flows using an APP-ID engine, shown as App Signature Check 308). For example, the monitored network traffic can include HTTP traffic, FTP traffic, DNS requests, unclassified application traffic (e g, unknown application traffic), and/or other types of traffic (e.g., traffic using other types of known or unknown protocols).

Referring to FIG. 3, network traffic monitoring begins at 302. An IP address and port engine 304 determines an IP address and port number for a monitored traffic flow (e.g., a session) based on packet analysis. A policy check engine 306 determines whether any policies can be applied based on the IP address and port number. As is also shown in FIG. 3, an application signature check engine 308 identifies an application (e.g., using an APP-ID engine using various application signatures for identifying applications based on packet flow analysis). For example, APP-ID engine 308 can be configured to determine what type of traffic the session involves, such as HTTP traffic, FTP traffic, DNS requests, unknown traffic, and various other types of traffic, and such classified traffic can be directed to an appropriate decoder, such as decoders 312, 314, and 316, to decode the classified traffic for each monitored session's traffic flow. As discussed above, DNS signatures can be applied at APP-ID engine 308 using bad domains data store 318 (e.g., a table, list, or other data store of bad domains, which can be in the form of signatures, such as DNS signatures). For example, bad domains can be periodically received (e.g., daily, hourly, or based on some other period of time or upon request) from a cloud security service (e.g., cloud security service 120 of FIG. 1) that provides firewall 300 with content updates (e.g., including signature updates, such as bad domain data including DNS signatures). In some implementations, bad domains data store 318 can be implemented as part of the signature engine, which can be implemented during protocol decoding (312), instead of during app signature check (308). In addition, if the monitored traffic is encrypted (e.g., encrypted using SSL, SSH, or another known encryption protocol), then the monitored traffic can be decrypted using a decrypt engine 310 (e.g., applying man in the middle techniques using a self-signed certificate). A known protocol decoder engine 312 decodes and analyzes traffic flows using known protocols (e.g., applying various signatures for the known protocol) and reports the monitored traffic analysis to a report and enforce policy engine 320. Identified traffic (no decoding required) engine 314 reports the identified traffic to the report and enforce policy engine 320. An unknown protocol decoder engine 316 decodes and analyzes traffic flows (e.g., applying various heuristics) and reports the monitored traffic analysis to the report and enforce policy engine 320. For example, triggered DNS signatures can be reported and enforced using report and enforce policy 320.

In some implementations, various other functional architectures and flows are provided to implement the policy enforcement using techniques described herein. For example, some of these functions can be implemented in software executed on a general processor and/or some of these functions can be implemented using hardware acceleration techniques for faster packet processing of network traffic.

Figure 4:
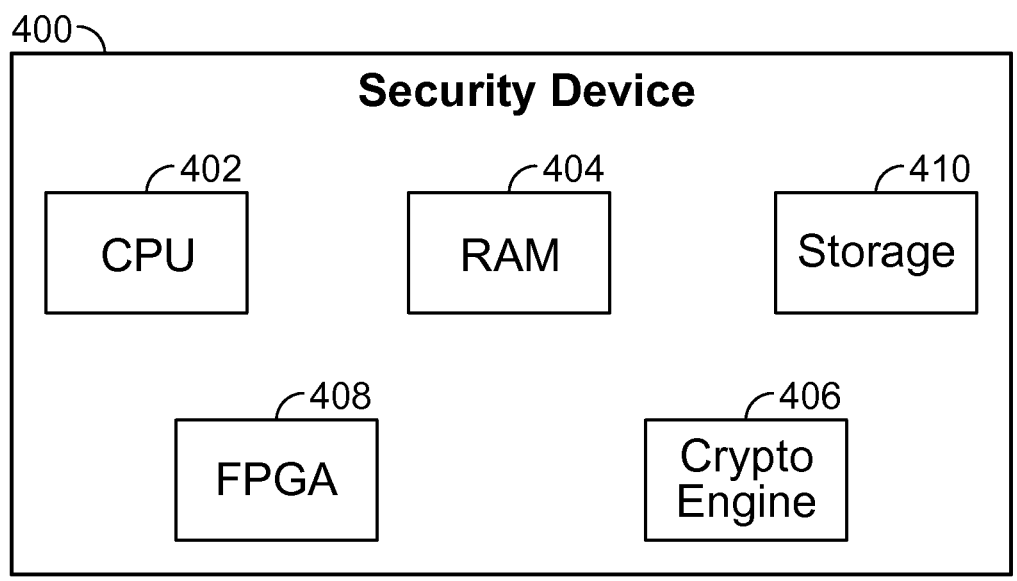
FIG. 4 is a functional diagram of hardware components of a security device for sinkholing bad network domains by registering the bad network domains on the Internet in accordance with some embodiments.

FIG. 4 is a functional diagram of hardware components of a security device for sinkholing bad network domains by registering the bad network domains on the Internet in accordance with some embodiments. The example shown is a representation of physical components that can be included in security device 400 (e.g., a data appliance, server, gateway, or other computing device). Specifically, security device 400 includes a high performance multi-core CPU 402 and RAM 404. Security device 400 also includes a storage 410 (e.g., one or more hard disks or solid state storage units), which is used to store policy and other configuration information as well as signatures (e.g., DNS signatures and/or other signatures that can be used by the security device, such as for firewall related functions). Security device 400 can also include one or more optional hardware accelerators. For example, security device 400 can include a cryptographic engine 406 configured to perform encryption and decryption operations, and one or more FPGAs 408 configured to perform signature matching, act as network processors, and/or perform other tasks.

Figure 5:
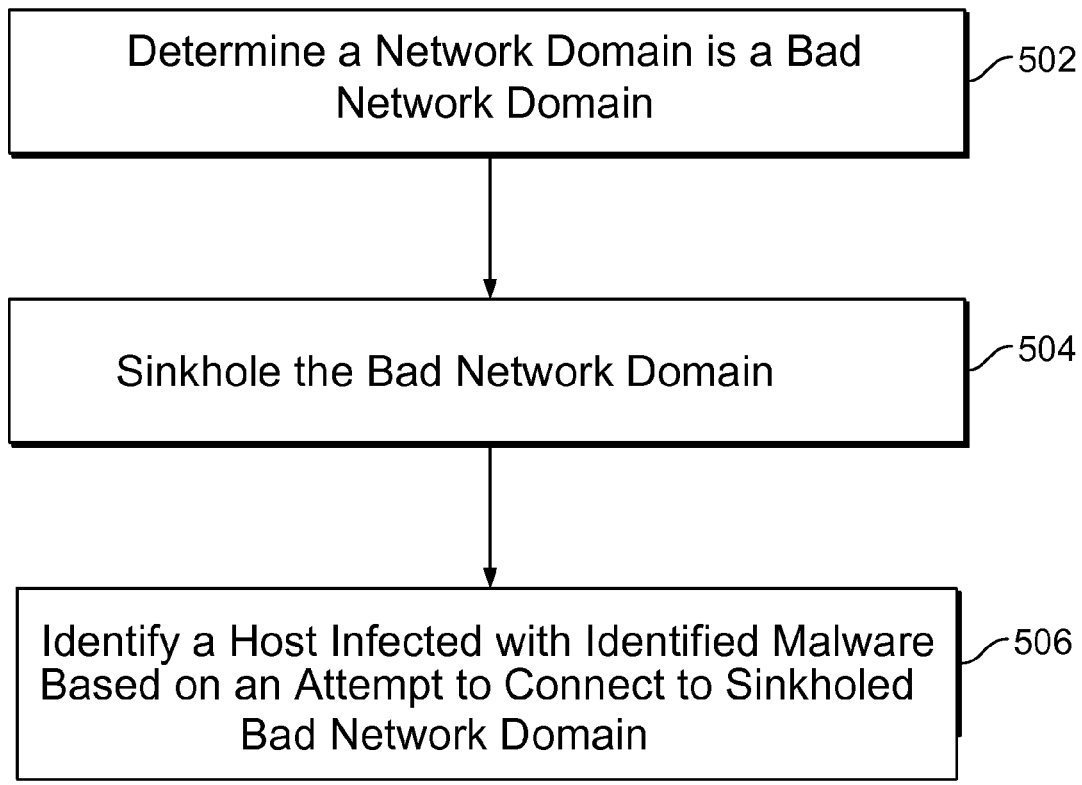
FIG. 5 is a flow diagram illustrating a process for sinkholing bad network domains by registering the bad network domains on the Internet in accordance with some embodiments.

FIG. 5 is a flow diagram illustrating a process for sinkholing bad network domains by registering the bad network domains on the Internet in accordance with some embodiments. At 502, determining a network domain is a bad network domain is performed. For example, the bad network domain can be determined to be associated with an identified malware (e.g., malware that has been identified and has been determined to be associated with the bad domain), and the bad network domain can be sinkholed by registering the bad network domain with a sinkholed IP address (e.g., a cloud security service can control the network resource, such as a server/appliance, associated with the sinkholed IP address). At 504, sinkholing the bad network domain is performed by registering the bad network domain on the Internet. For example, the bad network domain can be sinkholed by a cloud security service provider by registering the bad network domain with a sinkholed IP address (e.g., which can be associated with a network resource, such as a server/appliance, controlled by the cloud security service provider). At 506, identifying a host that is infected with the identified malware is performed based on an attempt by the host to connect to the sinkholed bad network domain (e.g., based on logged host attempts to connect to the network resource associated with the sinkholed IP address).

Figure 6:
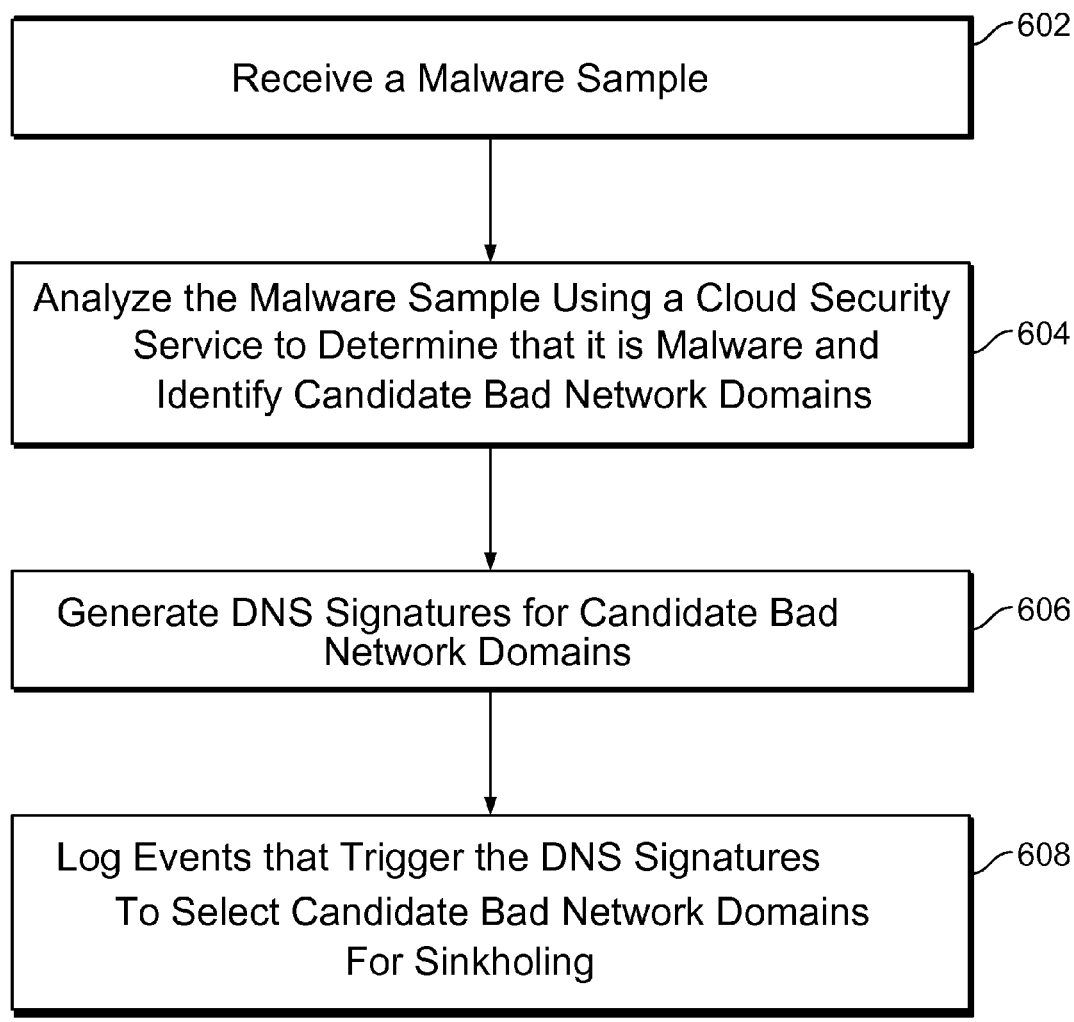
FIG. 6 is another flow diagram illustrating a process for sinkholing bad network domains by registering the bad network domains on the Internet in accordance with some embodiments.

FIG. 6 is another flow diagram illustrating a process for sinkholing bad network domains by registering the bad network domains on the Internet in accordance with some embodiments. At 602, a malware sample is received. For example, a cloud security service can receive malware samples from security devices (e.g., firewalls) of one or more customers. At 604, the malware sample is automatically analyzed using a cloud security service to determine that the malware sample is malware (e.g., to identify the malware as identified malware) and to identify candidate bad network domains. For example, network activity can be monitored during emulation of the malware sample to identify which bad network domains the identified malware attempts to connect to during the emulation, such as described above with respect to various embodiments. At 606, DNS signatures are generated for each of the candidate bad network domains. For example, these DNS signatures can be published (e.g., automatically distributed) by the cloud security service to firewalls of customers of the cloud security service. At 608, events that trigger one or more of the DNS signatures are logged. Based on analysis of these logged events, a subset of candidate bad network domains can be selected for sinkholing (e.g., to register if such are NXDOMAINs or to attempt to register to an IP address controlled by the cloud security service if, for example, a particular bad network domain is already registered by an entity associated with the identified malware, such as the malware author). For example, the cloud security service can periodically receive log data from firewalls of one or more customers that include logged events of DNS signatures for candidate bad network domain(s) being triggered by one or more host attempts to access such candidate bad network domain(s).

Figure 7:
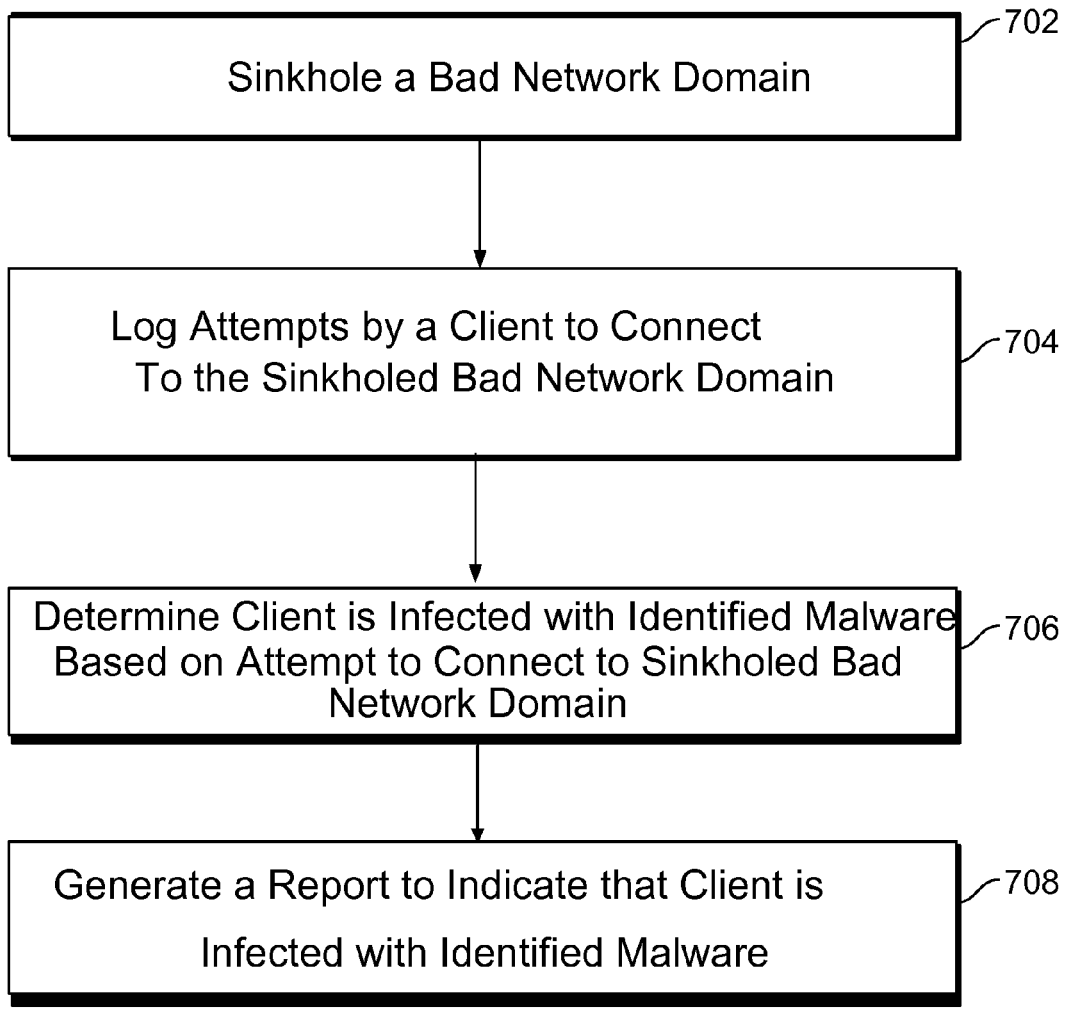
FIG. 7 is another flow diagram illustrating a process for sinkholing bad network domains by registering the bad network domains on the Internet in accordance with some embodiments.

FIG. 7 is another flow diagram illustrating a process for sinkholing bad network domains by registering the bad network domains on the Internet in accordance with some embodiments. At 702, a bad network domain is sinkholed. For example, a cloud security service provider can register the bad network domain to an IP address controlled by the cloud security service provider. At 704, attempts by a client (e.g., a client device or another type of host) to connect to the sinkholed bad network domain are logged (e.g., by the cloud security service, which controls a network resource that is configured with the IP address associated with the sinkholed bad network domain). At 706, that the client is infected with identified malware is determined based on the logged attempt by the client to connect to the sinkholed bad network domain. For example, network analysis of the identified malware can be used to uniquely associate the identified malware with the bad network domain, such as using various techniques described above. At 708, a report is automatically generated to indicate that the client is infected with identified malware based on the logged attempt by the client to connect to the sinkholed bad network domain.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for sinkholing bad network domains by registering the bad network domains on the Internet, comprising:
   a processor configured to:
   generate one or more signatures for a plurality of bad network domains;
   distribute the one or more signatures to a plurality of security devices to determine a set of candidate bad network domains for sinkholing;
   select a bad network domain included in the set of candidate bad network domains for sinkholing based on a detection of a threshold number of connections that were attempted to the bad network domain based on logged signature matches, wherein the bad network domain is associated with an identified malware;
   register the bad network domain with a domain registry to a valid IP address in order to sinkhole the bad network domain, wherein the bad network domain is sinkholed by registering the bad network domain such that an authoritative DNS server can translate the registered bad network domain to the valid IP address, and wherein the valid IP address is associated with a device controlled by a cloud security service provider; and
   identify a host that is infected with the identified malware based on an attempt by the host to connect to the valid IP address, wherein the host received a DNS query response that resolved the registered bad network domain to the valid IP address; and
   a memory coupled to the processor and configured to provide the processor with instructions.

2. The system recited in claim 1, wherein the processor is further configured to:
   determine that the bad network domain is not a registered network domain prior to registering the bad network domain with the domain registry to the valid IP address in order to sinkhole the bad network domain.

3. The system recited in claim 1, wherein the processor is further configured to:
   determine that the bad network domain is a non-existent domain (NXDOMAIN) prior to registering the bad network domain with the domain registry to the valid IP address in order to sinkhole the bad network domain.

4. The system recited in claim 1, wherein the processor is further configured to:
   generate a log for each attempted host connection to the valid IP address.

5. The system recited in claim 1, wherein the processor is further configured to:
   determine that the bad network domain is not a registered network domain prior to registering the bad network domain with the domain registry to the valid IP address in order to sinkhole the bad network domain; and
   generate a log for each attempted host connection to the valid IP address.

6. The system recited in claim 1, wherein register the bad network domain with the domain registry to the valid IP address in order to sinkhole the bad network domain further comprises:
   determine that the bad network domain is a registered network domain; and
   change the registered network domain for the bad network domain with the domain registry to a new IP address in order to sinkhole the bad network domain using the new IP address, wherein the new IP address corresponds to the valid IP address.

7. The system recited in claim 1, wherein the processor is further configured to:
   receive a plurality of malware samples; and
   execute each of the plurality of malware samples to identify the plurality of bad network domains.

8. A method of sinkholing bad network domains by registering the bad network domains on the Internet, comprising:
   generating one or more signatures for a plurality of bad network domains;
   distributing the one or more signatures to a plurality of security devices to determine a set of candidate bad network domains for sinkholing;
   selecting a bad network domain included in the set of candidate bad network domains for sinkholing based on a detection of a threshold number of connections that were attempted to the bad network domain based on logged signature matches, wherein the bad network domain is associated with an identified malware;

registering the bad network domain with a domain registry to a valid IP address in order to sinkhole the bad network domain, wherein the bad network domain is sinkholed by registering the bad network domain such that an authoritative DNS server can translate the registered bad network domain to the valid IP address, and wherein the valid IP address is associated with a device controlled by a cloud security service provider; and identifying a host that is infected with the identified malware based on an attempt by the host to connect to the valid IP address, wherein the host received a DNS query response that resolved the registered bad network domain to the valid IP address.

9. The method of claim 8, further comprising:
determining that the bad network domain is not a registered network domain prior to registering the bad network domain with the domain registry to the valid IP address in order to sinkhole the bad network domain.

10. The method of claim 8, further comprising:
determining that the bad network domain is a non-existent domain (NXDOMAIN) prior to registering the bad network domain with the domain registry to the valid IP address in order to sinkhole the bad network domain.

11. The method of claim 8, further comprising:
generating a log for each attempted host connection to the valid IP address.

12. The method of claim 8, wherein registering the bad network domain with the domain registry to the valid IP address in order to sinkhole the bad network domain further comprises:
determining that the bad network domain is a registered network domain; and
changing the registered network domain for the bad network domain with the domain registry to a new IP address in order to sinkhole the bad network domain using the new IP address, wherein the new IP address corresponds to the valid IP address.

13. A computer program product for sinkholing bad network domains by registering the bad network domains on the Internet, the computer program product being embodied in a non-transitory tangible computer readable storage medium and comprising computer instructions for:
generating one or more signatures for a plurality of bad network domains;
distributing the one or more signatures to a plurality of security devices to determine a set of candidate bad network domains for sinkholing;
selecting a bad network domain included in the set of candidate bad network domains for sinkholing based on a detection of a threshold number of connections that were attempted to the bad network domain based on logged signature matches, wherein the bad network domain is associated with an identified malware;
registering the bad network domain with a domain registry to a valid IP address in order to sinkhole the bad network domain, wherein the bad network domain is sinkholed by registering the bad network domain such that an authoritative DNS server can translate the registered bad network domain to the valid IP address, and wherein the valid IP address is associated with a device controlled by a cloud security service provider; and identifying a host that is infected with the identified malware based on an attempt by the host to connect to the valid IP address, wherein the host received a DNS query response that resolved the registered bad network domain to the valid IP address.

14. The computer program product recited in claim 13, further comprising computer instructions for:
determining that the bad network domain is not a registered network domain prior to registering the bad network domain with the domain registry to the valid IP address in order to sinkhole the bad network domain.

15. The computer program product recited in claim 13, further comprising computer instructions for:
determining that the bad network domain is a non-existent domain (NXDOMAIN) prior to registering the bad network domain with the domain registry to the valid IP address in order to sinkhole the bad network domain.

16. The computer program product recited in claim 13, further comprising computer instructions for:
generating a log for each attempted host connection to the valid IP address.

17. The computer program product recited in claim 13, wherein registering the bad network domain with the domain registry to the valid IP address in order to sinkhole the bad network domain further comprises:
determining that the bad network domain is a registered network domain; and
changing the registered network domain for the bad network domain with the domain registry to a new IP address in order to sinkhole the bad network domain using the new IP address, wherein the new IP address corresponds to the valid IP address.

18. The method of claim 8, further comprising:
determining that the bad network domain is not a registered network domain prior to registering the bad network domain with the domain registry to the valid IP address in order to sinkhole the bad network domain; and
generating a log for each attempted host connection to the valid IP address.

19. The method of claim 8, further comprising:
receiving a plurality of malware samples; and
executing each of the plurality of malware samples to identify the plurality of bad network domains.

20. The computer program product recited in claim 13, further comprising computer instructions for:
determining that the bad network domain is not a registered network domain prior to registering the bad network domain with the domain registry to the valid IP address in order to sinkhole the bad network domain; and
generating a log for each attempted host connection to the valid IP address.

21. The computer program product recited in claim 13, further comprising computer instructions for:
receiving a plurality of malware samples; and
executing each of the plurality of malware samples to identify the plurality of bad network domains.

\* \* \* \* \*